PEAK OUTPUT
POWER 30 KW 35 n sec.

6.25 ms

INVENTORS.
ALEXANDER D. JACOBSON,
VIKTOR EVTUHOV,
BY
J. H. Haskell
ATTORNEY.

United States Patent Office 3,606,517
Patented Sept. 20, 1971

3,606,517
HOLOGRAPHIC MOTION PICTURE SYSTEM
Alexander D. Jacobson, Los Angeles, and Viktor Evtuhov, Pacific Palisades, Calif., assignors to Hughes Aircraft Company, Culver City, Calif.
Filed Feb. 14, 1969, Ser. No. 799,290
Int. Cl. G02b 27/22
U.S. Cl. 350—3.5                                11 Claims

ABSTRACT OF THE DISCLOSURE

A holographic motion picture system is disclosed for producing a succession of holograms capable of faithfully reproducing the continuous motion of a moving subject. The system includes a continuously pumped ruby laser operated in the repetitive Q switched mode to produce light pulses at a rate of 160 p.p.s. Every eighth pulse is used to produce a hologram of a moving subject on a moving light sensitive film.

BACKGROUND OF THE INVENTION

(1) Field of the invention

The present invention generally relates to the art of holography and, more particularly, to a system for producing holograms of a moving subject on a moving film.

(2) Description of the prior art

Briefly, holography is the art in which coherent light from a source such as a laser is used to produce a photorecord of a subject in the form of an interference fringe pattern, which is recorded on an appropriate light sensitive film or plate. The recorded interference pattern is known as a hologram. A hologram is produced by exposing the film or plate to laser-produced coherent light which is directed to the film or plate along a reference beam path and along a subject beam path, in which the subject is located. The novel properties of a hologram, in particular, its ability to produce a three-dimensional image of the subject when illuminated with coherent light, are well known.

As is appreciated, in order to produce a high quality hologram the lengths of the two paths along which the laser light is directed to the hologram must be carefully controlled to insure that they are within the coherence length of the laser radiation. Another important requirement is that the radiation have a high degree of spatial coherence. Also, since all present day films or plates, useful for holographic purposes, have emulsions which are relatively insensitive to light, it is of primary importance that the light pulses be of sufficient energy to expose the hologram. Another important requirement is that the subject remain stationary during the exposure duration to a fraction of the wavelength of the illuminating light. These stringent requirements have greatly limited the types of lasers which can be used for holographic purposes.

Though holography is a relatively new art, the usefulness of holograms in scientific studies and non-scientific applications is well appreciated. Such usefulness could be further extended if one were able to produce a succession of holograms of a moving subject so that when the developed holograms are successively illuminated the original motion of the subject could be reproduced in three dimensions. Alternately stated, the usefulness of holography would be greatly extended if one were able to produce a holographic motion picture of a moving subject. One example, where such a capability would be of great significance is in studies of beams of particles where the beam geometry is quite erratic, a characteristic which often cannot be detected or properly analyzed with conventional two-dimensional photography.

Despite such advantages none of the prior art holographic systems is capable of producing a holographic motion picture. This is primarily due to the absence in the prior art of a source of coherent light, adequate for such purposes.

OBJECTS AND SUMMARY OF THE INVENTION

It is a primary object of the present invention to provide a source of coherent light which is adequate to illuminate a moving subject to produce holograms thereof.

Another object of the present invention is to provide a source of coherent light which is adequate to illuminate a moving subject to produce a succession of holograms at a sufficiently high rate so that the holograms after development and appropriate illumination are capable of reproducing the subject's original motion in three dimensions.

Yet another object of the present invention is to provide a system for producing holograms of a moving subject on a moving film.

A further object of this invention is to provide a system for producing a succession of holograms of a moving subject at a rate which is high enough so that the developed holograms when successively illuminated by coherent light produce a motion picture of the subject in three dimensions.

Yet a further object of the present invention is to provide a method of producing holograms of a moving subject from which the original subject motion may be faithfully reproduced in three dimensions.

These and other objects of the invention are achieved by providing a holographic system including a source which is capable of providing coherent light pulses which are adequate to illuminate a moving subject to produce a succession of holograms on a moving film in a camera, which forms part of the system of the present invention. The energy of each light pulse is sufficiently high to adequately expose the film emulsion. The duration of each pulse is short enough to insure that the subject's motion does not effect the high quality of the holograms. The source provides pulses at a rate which is adequate to produce a succession of holograms such that when these holograms are used a true three dimensional reproduction of the subject in motion is created. The source provides these pulses for a sufficient duration to record completely the subject's motion.

As is known in motion picture photography to produce a picture of continuous motion, picture frames are projected at a rate of at least 16 frames per second. At a lower frame projection rate a jitter effect is created. Thus, to produce an adequate holographic motion picture, a light source is needed which is capable of providing light pulses at a rate of at least 16 pulses per second (p.p.s.), or at least close to 16 p.p.s. if some jitter can be tolerated. For explanatory purposes it is assumed that for an adequate holographic motion picture a pulse rate in the range of 16 p.p.s. or more is needed.

The novel features of the invention are set forth with particularity in the appended claims. The invention will best be understood from the following description when read in conjunction with the accompanying drawings.

DESCRIPTION OF THE PREFERRED EMBODIMENTS

Before preceding to describe the present invention in detail attention is first directed to the following brief discussion of the type and rate of light pulses which are needed to produce holograms at a sufficiently high rate so that they can be used to produce a true holographic motion picture. As is appreciated, since the subject to be photographed is assumed to be in motion, each light pulse should be of short duration, yet have sufficiently high energy to properly expose the relatively light-insensitive film on which each hologram is produced. Clearly, the wavelength of the light should be in the visible range. The light pulse should be of sufficient coherence length and sufficient spiral coherence to produce a high quality hologram. Another most important requirement, not met by prior art lasers which are used, or suggested for use, in holography is that the pulses be provided at a rate adequate for motion picture production.

The requirements of pulse duration, sufficient energy per pulse, sufficient coherence and proper light wavelength within the visible range can be met by prior art lasers. For example, such requirements may be met by a giant pulse ruby laser. However, none of the prior art lasers is capable of providing such pulses at a rate of about 16 p.p.s. suitable for use in the production of a holographic motion picture. It should be pointed out that some lasers can produce light pulses at a rate of 16 p.p.s. and more. However, such pulses are not useful for holographic purposes either due to inappropriate light wavelength, pulse duration, inadequate coherence characteristics or insufficient energy per pulse or a combination of the above requirements.

It has been discovered that the needed light pulses for the production of a holographic motion picture may be provided by a continuously pumped ruby laser which is operated in a repetitive Q switched mode. The continuously pumped ruby laser provides light pulses for the production of high quality holograms. By operating such a laser in the repetitive Q switched mode the continuously pumped ruby laser provides the pulses at a sufficiently high rate, so that the pulses can be used to produce holograms at a sufficient rate, in order to produce a high quality true holographic motion picture.

It is appreciated that operating lasers in a repetitive Q switched mode has been practiced in art. However, the lasers known to have been operated in such a mode are of the type which do not provide light pulses adequate for holographic purposes. It is further appreciated that continuously pumped ruby lasers have been known in the art. However, such lasers have not been operated in the repetitive Q switched mode. Furthermore, such lasers have not been used to produce pulses at a rate high enough during a sufficient duration with adequate coherence for the production of a true holographic motion picture.

Figure 1:
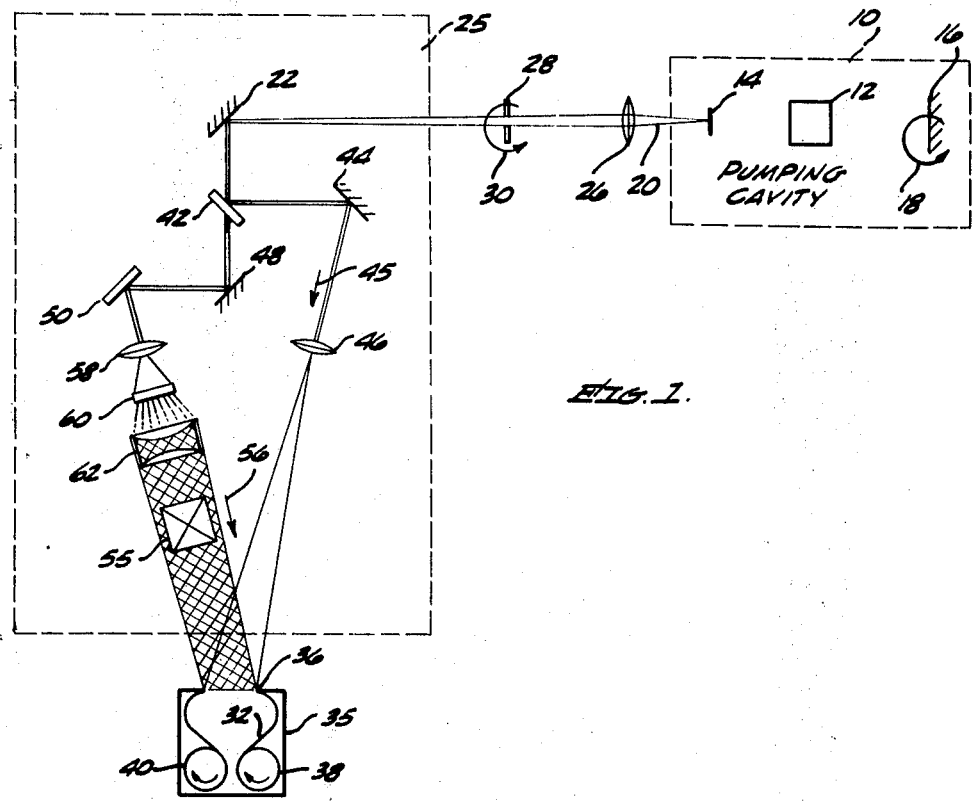
FIG. 1 is a simplified diagram of the holographic motion picture system of the present invention.

Reference is now made to FIG. 1 wherein numeral 10 designates a continuously pumped ruby laser which is assumed to be operated in the repetitive Q switched mode. The laser 10 is shown including a ruby rod 12 located in the pumping cavity between a front reflector 14 and a rear reflector 16. The rear reflector is rotatable as indicated by arrow 18 for repetitive Q switching operation so that for each revolution of reflector 16 the laser 10 provides an output light pulse 20. The term "continuously pumped" intends to refer to the fact that the pump lamp is on continuously. In such a laser the mode of operation is determined by the state of motion of the rear reflector 14. If the rear reflector is stationary the laser output is C.W. However by rotating the rear reflector continuously the laser output is a train of Q-switched pulses.

Each light pulse 20 is directed to a reflecting mirror 22. Mirror 22 forms part of a two-beam transmission illumination holographic system, designated in FIG. 1 by numeral 25. In order to conserve energy, each light pulse from the laser 10 is directed to mirror 22 through a recollimating lens 26. If the laser which is used, such as laser 10, provides pulses at a rate which exceeds the desired rate of hologram production, a shutter 28 may be incorporated. In FIG. 1, shutter 28 is assumed to be of the rotatable type as indicated by arrow 30. In practice, the shutter is synchronized with the rotating rear reflector 16 to limit the number of light pulses per second which are directed to mirror 22.

As is appreciated, the function of system 25 is to direct each light pulse in two paths to a film on which a hologram is created. In accordance with the teachings of this invention, the film 32 is located in a lensless and shutterless motion picture camera 35. The film is advanced in front of a camera opening 36 between a spool reel 38 and a take-up reel 40. The camera 35 is lensless since holography is a lensless imaging process. In the particular invention the camera shutter is not necesary since, as will be pointed out hereafter, the light pulses are of very short duration. Consequently, they, rather than a shutter, control the film exposure time.

The system 25 includes a beam splitter 42 which reflects part of the energy of each light pulse which is directed thereto from mirror 22 to a mirror 44. Mirror 44 in turn directs the light along a reference beam path 45 to the film 32, exposed through opening 36. To insure that the entire opening is illuminated, a lens 46 is placed in the reference beam path to spread the beam of each light pulse from mirror 44 which, up to that point may be assumed to be a very narrow collimated beam, e.g. 1 mm. in diameter.

Beam splitter 42 transmits part of the energy of each light pulse to a fixed mirror 48 which in turn reflects it to a mirror 50. The latter reflects the light toward the opening 36 to illuminate by transmission a subject 55, located in the subject beam path 56. The mirror 50 is assumed to be movable and rotatable in order to insure that the lengths of the reference and subject beam paths are within the required coherence length which is necessary to produce the desired interference fringe patterns on film 32 so as to form the holograms thereon.

As seen from FIG. 1, the two beam transmission illumination holographic system 25 further includes a lens 58 in the subject beam path 56. The function of lens 58, like that of lens 46, is to spread the very narrow light beam from mirror 50. System 25 further includes a light diffuser 60 and an optical condenser system 62 which are located between the lens 58 and the subject 55. Briefly stated, the function of the diffuser 60 is to mix the rays of light from lens 58 so that the subject is illuminated by rays from an extended, rather than a point source. This enables the viewing of the subject image by the naked eye without resort to optical means. The condenser system 62 is used to collect the light from the diffuser and divert it to the film. This is done in order to maximize the amount of light energy which reaches the film by way of the subject 55. As previously indicated, the subject 55 is assumed to be in motion.

In operation, the film 32 is advanced in the camera 35 preferably at a uniform speed which is high enough so that light pulses which pass through shutter 28 are exposed through opening 36 to a previously unexposed portion or frame of the film 32 to produce a hologram thereon. As long as the rate of the pulses is in the range of 16 p.p.s. or more, the succession of holograms which is produced would reproduce a true picture of the continuous motion of the subject.

For detailed studies of high speed subjects it may be desirable to produce holograms at a relatively high rate and then reproduce the motion by projecting the holograms at a lower rate thereby effectively slowing down the subject's speed. Such an operation is analogous to photographing a high speed event with a conventional movie camera at a high rate of frames per second, e.g., 36 frames per second and then projecting the developed film at a slower rate such as 16 frames per second. The continuously pumped ruby laser operated in the repetitive Q switched mode is particularly useful for such purposes since as will be pointed out hereafter, it is capable of providing 160 and more light pulses per second.

Figure 2:
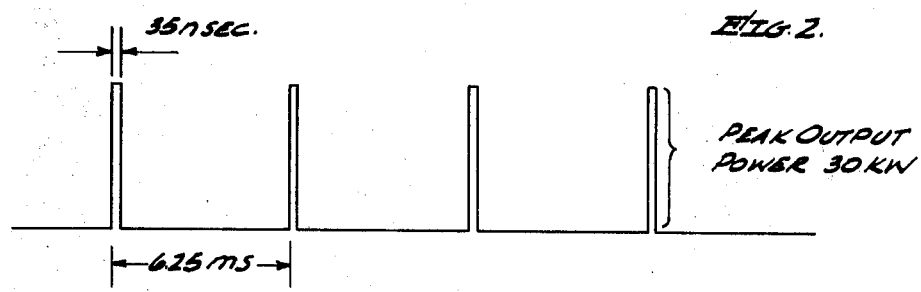
FIG. 2 is a simple diagram of a succession of pulses representing light pulses, provided by a light source, shown in FIG. 1.

In one particular embodiment actually reduced to practice, which will now be described for explanatory purposes, rather than to limit the scope of the invention thereto, the laser 10 comprised a water-cooled eliptical pumping cavity which contained a 2-inch long by ⅛ inch diameter ruby rod and a linear high pressure mercury arc lamp, as well as the front reflector and the rotating rear reflector. The laser was operated in the repetitive Q switched mode by simply rotating the rear reflector. One light pulse was produced by the laser per revolution of the mirror. In the particular application, the ruby produced 160 light pulses per second. A typical output pulse was 30 kw. in peak power and 35 nsec. in duration. A succession of a few pulses is diagrammed in FIG. 2 wherein each pulse is represented as an idealized space pulse for presentation purposes only. The laser operated in multiple longitudinal modes. As a result the measured coherence length per pulse was found to be approximately 2 cm.

In one experiment which produced most satisfactory results, a film manufactured by Agfa Gavaert, with an emulsion 10E75 on an acetate base in 70 mm. format was used as recording medium. The emulsion was chosen because of its exceptionally high resolving power (3000 lines per mm.) and its relatively high sensitivity at 6943 A.— the wavelength of the ruby laser light. The opening 36 of the camera 35 was large enough to enable the production of approximately square holograms —60 mm. by 67 mm.

Figure 3:
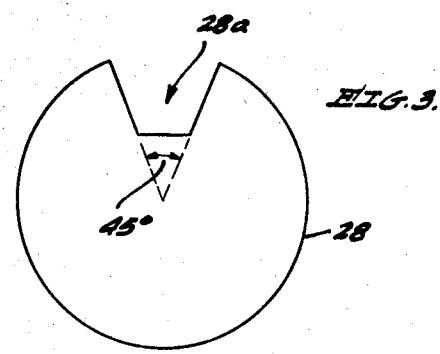
FIG. 3 is a front view of a shutter shown in FIG. 1.

Shutter 28 was employed to limit the number of light pulses for laser 10 which were used for hologram production to 20 per second. Since the laser 10 provided 160 p.p.s., the shutter 28 was constructed to permit every eighth pulse from laser 10 to be directed to mirror 22. One simple embodiment of the shutter 28 is shown in FIG. 3 to which reference is made herein. In practice the shutter in the form of a disc with a slot 28a shaped as a truncated 45° sector was synchronized with the rotating rear reflector 18, to rotate at ⅛ of the rate of rotation of the reflector 18. As a result only one of 8 pulses was permitted to pass to mirror 22 when slot 28a was in the light path.

It should be appreciated by those familiar with the art of holography and motion picture photography that in order to minimize undesirable image jitter frame-by-frame registration should be maintained. Fortunately, in a holographic motion picture, unlike a conventional movie in which a small frame is projected on a large screen, a hologram is viewed at approximately unity magnification. Consequently, any image jitter due to inadquate frame registration is minimal. However, if found annoying, such jitter can be eliminated by carefully synchronizing the speed of the film with that of the laser's rotating rear reflector.

It should be pointed out that the film movement during the exposure time should not be excessive in order not to affect the quality of the individual holograms. If high film speeds are required, such as would be the case if large holograms are to be produced at a high rate, the problem of film movement during exposure time may be overcome by exposing the film with short duration light pulses. It should be further pointed out that in order to produce high quality holograms it is important that the subject's motion during exposure time be only a fraction of the light wavelength. Thus, for any given light wavelength the desired duration of each light pulse is inversely proportional to the subject's speed or velocity—the higher the subject's velocity, the shorter the pulse's duration.

There has accordingly been described a novel holographic motion picture system. The system includes a source, such as the continuously pumped ruby laser operated in the repetitive Q switched mode, to provide a sufficient number of light pulses to produce a number of holograms per second which is sufficient to faithfully reproduce the continuous motion of a moving subject. Such a system is useful whenever a holographic display or recording of a moving subject is desirable. For example, such a system may be used in motion picture holomicroscopy, time-resolved holographic interferometry and in time resolved studies of particle dynamics.

Although a particular embodiment of the invention has been described and illustrated herein, it is recognized that modifications and variations may readily occur to those skilled in the art and, consequently, it is intended that the claims be interpreted to cover such modifications and equivalents.

What is claimed is:
1. A holographic motion picture system comprising:
   (a) a continuously pumped solid-state laser for generating spatially coherent and temporally coherent radiation along a path including means comprising a rotatable reflector for switching said laser repetitively in the Q switched mode to produce pulsed radiation having a relatively high repetition rate;
   (b) pulsed rate control means comprising shutter means coupled to the switching means and disposed in the path of said pulsed radiation external to said laser for passing radiated pulses each having a peak power substantially greater than 1,000 watts and at desired lower repetition rates;
   (c) light-sensitive motion picture recording means having frames thereof positioned to receive pulsed radiation from a subject irradiated with said passed radiation pulses from said laser means including pulsed radiation from the subject during movement thereof;
   (d) means for directing a portion of the passed radiation pulses generated by said laser means which does not irradiate the subject to said recording means for creating an interference fringe pattern at said recording means; and
   (e) means for moving said light sensitive recording means to position sequential frames thereof for irradiation to produce motion pictures of said subject capable of visually reproducing continuous movement of said subject including surroundings thereof.
2. A motion picture holographic system comprising in combination:
   (a) a continuously pumped solid-state laser including means comprising a rotatable reflector for switching said laser repetitively in the Q switched mode to produce pulsed radiation having a relatively high repetition rate;
   (b) pulse rate control means including a shutter external of said laser, said control means being capable of reducing the relatively high pulse repetition rate to correspond to any desired pulse repetition rate of said system, and coupled to the said switching means for synchronous operation thereof to provide for passing said pulses at the desired lower rate whenever each of said passed pulses show a peak power substantially greater than 1000 watts;
   (c) an optical system for directing portions of the radiation from said laser in two different paths toward a frame of a motion picture recording medium one of said paths being adapted to irradiate a moving subject including continuous movement of the subject with said radiation, and
   (d) means for moving said recording medium for irradiating sequential ones of said frames at the desired rate so that movement including continuous movement of the subject is recorded in order to produce motion pictures capable of visually reproducing movement including continuous movement of said subject for viewing.

3. The motion picture holographic system according to claim 1 in which said system further includes a motion picture camera housing including said means for moving the light sensitive motion picture recording means, said moving means being constructed and arranged to move said light sensitive recording means past an aperture in said housing to expose the sequential frames of said light sensitive means to said radiation to form a succession of holograms at any desired rate to enable visual reproduction of continuous motion of the subject.

4. The motion picture holographic system according to claim 1 in which the radiation of said laser is capable of irradiating a frame area of approximately 60 millimeters square of said light sensitive means and produce on the order of at least approximately sixteen holograms per second and having corresponding dimensions.

5. The motion picture holographic system according to claim 2 in which the continuously pumped solid-state laser switching means comprising rotatable reflector means is capable of being rotated to produce output pulses and said control means provides for passing a train of pulses having a lower repetition rate on the order of at least approximately sixteen pulses per second for irradiating sequential ones of said frames at said lower repetition rate.

6. The motion picture holographic system according to claim 5 in which each of said pulses of the train has a peak power substantially greater than one thousand watts for producing said succession of holograms at the desired lower repetition rate.

7. The motion picture holographic system according to claim 6 in which each of said pulses of the train has a peak power of approximately 30,000 watts and having a duration of approximately 35 nanoseconds and pulse interval of approximately 6.25 microseconds.

8. The motion picture holographic system according to claim 2 in which said control means comprising a shutter is disposed to pass a succession of radiated pulses at a predetermined rate which is determined by the desired rate of recording of the moving subject in real time on the order of approximately sixteen holograms per second or greater.

9. The motion picture holographic system according to claim 2 in which said pulse rate control means including a shutter, said shutter comprises a movable member having an aperture therein, and means for synchronizing said shutter with said rear reflector to pass pulses at a desired repetition rate of recording holograms of the moving subject in real time for visual reproduction of the continuous motion of the moving subject.

10. The motion picture holographic system according to claim 2 in which the continuously pumped solid-state laser is repetitively switched to produce said pulsed radiation said pulse rate control means comprising a shutter which includes synchronizing means for synchronizing said shutter with the switching means to pass a succession of pulses of radiation at a rate on the order of approximately sixteen pulses per second or greater.

11. The motion picture holographic system according to claim 10 in which the pulse repetition rate is greater than sixteen pulses per second and the said shutter passes a portion of said pulses to said recording medium to produce said motion pictures.

References Cited

UNITED STATES PATENTS 3,423,691   1/1969   Chernoch et al. _____ 331—94.5

OTHER REFERENCES

Brooks et al., Applied Physics Letters, vol. 7, No. 4, August 1965, pp. 92–94.

Roess et al., Applied Physics Letters, vol. 8, No. 1 January 1965, pp. 10–12.

Cutrona et al., Laser Focus, vol. 3, No. 23, December 1967, pp. 30–36.

De Bitetto, Laser Focus, vol. 4, No. 17, September 1968, pp. 36–37.

DAVID SCHONBERG, Primary Examiner

R. STERN, Assistant Examiner

U.S. Cl. X.R.

352—85